United States Patent [19]

Kämpf

[11] Patent Number: 5,660,265

[45] Date of Patent: Aug. 26, 1997

[54] VIBRATORY CONVEYOR FOR PARTICLES OF BULK MATERIAL

[75] Inventor: Joachim Kämpf, Buxtehude, Germany

[73] Assignee: Hauni Maschinenbau AG, Hamburg, Germany

[21] Appl. No.: 394,625

[22] Filed: Feb. 27, 1995

[30] Foreign Application Priority Data

Mar. 9, 1994 [DE] Germany .......... 44 07 789.0

[51] Int. Cl.⁶ ............................................ B65G 27/34
[52] U.S. Cl. ........................................ 198/609; 198/771
[58] Field of Search ............................. 198/609, 771;
453/55; 222/199, 200

[56] References Cited

U.S. PATENT DOCUMENTS

| 860,371 | 7/1907 | Halliday | 222/200 X |
|---|---|---|---|
| 2,619,090 | 11/1952 | Clausen | 222/200 X |
| 2,907,498 | 10/1959 | Van Der Lely et al. | 222/200 X |
| 3,752,168 | 8/1973 | Bayha | 453/55 X |
| 4,327,827 | 5/1982 | Jedo et al. | 198/771 |
| 4,359,175 | 11/1982 | Lizenby | 222/199 |
| 4,655,341 | 4/1987 | Forslund | 198/771 |

FOREIGN PATENT DOCUMENTS

WO93/03863  3/1993  WIPO.

*Primary Examiner*—F. J. Bartuska
*Attorney, Agent, or Firm*—Darby & Darby

[57] ABSTRACT

A vibratory conveyor for particles of tobacco or other bulk material has a trough with an elongated bottom wall the upper side of which merges smoothly into a downwardly sloping convex cylindrical or substantially cylindrical external surface of a tubular or like member forming part of the front portion of the trough. This ensures that fragments of dust (if any) which are being entrained by the particles of bulk material are less likely to be expelled or permitted to escape from successive increments of the flow of bulk material advancing beyond the bottom wall of the trough. Moreover, the particles of conveyed bulk material are more likely to remain in their prescribed path.

10 Claims, 1 Drawing Sheet ns in conveyors for bulk materials in general, and more particularly to improvements in vibratory conveyors. Still more particularly, the invention relates to improvements in vibratory conveyors which can be utilized with advantage for the transport of particles of comminuted natural, artificial and/or substitute tobacco and/or other particle which do or which are likely to entrain fragments of dust or other minute solid matter.

VIBRATORY CONVEYOR FOR PARTICLES OF BULK MATERIAL

BACKGROUND OF THE INVENTION

The invention relates to improvements in conveyors for bulk materials in general, and more particularly to improvements in vibratory conveyors. Still more particularly, the invention relates to improvements in vibratory conveyors which can be utilized with advantage for the transport of particles of comminuted natural, artificial and/or substitute tobacco and/or other particle which do or which are likely to entrain fragments of dust or other minute solid matter.

A drawback of many presently known vibratory conveyors for particles of bulk material, including comminuted tobacco leaves, is that they are likely to segregate from the conveyed particles of bulk material large quantities of dust and/or other fragments of solid materials With attendant contamination of the surrounding atmosphere. Such conventional vibratory coveyors are particularly likely to permit and/or to cause the segregation of substantial quantities of dust and/or other relatively small impurities into the atmosphere when one or more streams of particles are caused to advance from a preceding conveying unit (such as a vibratory trough) onto or into a second conveying unit (e.g. another trough or a belt conveyor). The fragments of dust and/or other minute solid particles which become separated from the stream or streams of particulate bulk material can constitute overly comminuted portions of the particles and/or other solid substances which, at least in many instances, should not be permitted to leave the path for the conveyed particles of bulk material.

The reason for segregation of substantial quantities of dust and/or other solid impurities is that the oscillatory movements of a tray or another mobile unit of vibratory conveyor cause the development of no readily controllable flows of air which expels or entrains the impurities from the stream or streams of conveyed particles of bulk material.

The escape of thus segregated minute solid particles from the stream or streams of particulate bulk material is undesirable for the reasons of health if such particles are permitted to escape from the conveyed stream or streams in the interior of a production line for the making of cigarettes and/or other products of the tobacco processing industry. If the solid particles are to be permitted to leave the plant,they must be intercepted by suitable filters or other expensive, complex and bulky systems which must be cleaned at frequent intervals.

OBJECTS OF THE INVENTION

An object of the invention is to provide a novel and improved vibratory conveyor which is constructed and assembled in such a way that it can greatly reduce the percentage of solid impurities which are permitted or caused to escape from the path or paths for one or more flows of particulate bulk materials.

Another object of the invention is to provide a novel and improved trough or an analogous particle advancing unit which can be put to use in the above outlined vibratory conveyor.

A further object of the invention is to provide a vibratory tray with novel and improved means for reducing the likelihood of separation of soild impurities from useful particles of particulate bulk material, such as streams of comminuted tobacco leaves.

An additional object of the invention is to provide a novel an improved combination of vibratory particle conveying units in an apparatus for the transport of comminuted tobacco leaf laminae in cigarette making and/or other plants of the tobacco processing industry.

A further object of the inventions to provide a novel and improved vibratory conveyor which can be put to use as a superior substitute for vibratory conveyors in existing cigarette making and/or other tobacco processing plants.

Another object of the invention is to provide a vibratory conveyor with novel and improved means for reducing the likelihood of or for preventing the escape of solid impurities at the particle receiving and particle discharging portions of such conveyor.

An additional object of the invention is to provide a novel and improved method of reducing the likelihood of contamination of the area surrounding a vibratory conveyor for the transport of particulate bulk materials normally carrying minute particles of dust and/or other minute solid materials.

Sill another object of the invention is to provide a method of preventing untimely separation of comminuted tobacco particles from tobacco dust and/or other minute solid fragments in cigarette making and/or other plants of the tobacco processing industry and/or others.

SUMMARY OF THE INVENTION

One feature of the present invention resides in the provision of a vibratory conveyor for the transport of particles of bulk material (such as fragments of tobacco leaf laminae) in a predetermined direction. The improved conveyor comprises a trough having a particle receiving first portion and a particle discharging second portion. The latter is spaced apart from the first portion in the predetermined direction and each of the first and second portions has a boundary extending transversely of the predetermined direction (e.g., at right angles or at an oblique angle, such as 45°, to the predetermined direction). At least one of the boundaries has an aerodynamically rounded profile which reduces the likelihood of agitation of relatively large quantities of air in response to oscillatory movements of the tray and the resulting segregation of appreciable quantities of dust and/or other minute solid impurities and/or other fragments from the stream or streams of conveyed particulate bulk material.

The trough further comprises a bottom wall, and the aerodynamically rounded profile can be defined by an external surface of an at least partially tubular member which is carried by the bottom wall and forms part of one of the first and second portions.

The trough can further comprise a second bottom wall which is spaced apart from and is disposed beneath and is inclined relative to the first mentioned bottom wall in the predetermined direction from one of the first and second portions toward the other of the first and second portions (particularly upwardly from the second portion toward the first portion of the trough). Such trough can further comprise parallel or substantially parallel skirts which are spaced apart from each other as seen transversely of the predetermined direction and flank the second bottom wall. The skirts can be affixed to at least to one of the bottom walls.

The first portion of the trough can include a tubular rear wall which is carried by the first named bottom wall.

Alternatively, the first portion of the trough can include a partially tubular member extending transversely of the predetermined direction and having an accessible concave side confronting the second portion of the trough.

At least one of the boundaries can be oriented in such a way that it is at least substantially normal to the predetermined direction. Alternatively, at least one of the boundaries can make an oblique angle with the predetermined direction.

The vibratory conveyor of the present invention can further comprise at least one second trough which is disposed at a level above the first named through and has a particle receiving first portion and a particle discharging second portion at least partially overlying or overlapping the bottom wall of the first named trough. At least the second portion of the second trough can be provided with a boundary having an aerodynamically rounded profile. The second trough can further comprise an elongated bottom wall which extends from the respective first portion toward the respective second portion and at least substantially at right angles to the predetermined direction. The boundary of the second portion of the second trough makes (or can make) with the predetermined direction an oblique angle, e.g., an angle at least approximating 45°.

The method of the present invention includes the step of imparting to at least one end portion of a vibratory trough an outline such that minute solid fragments which share the movements of the particles of bulk material along their path or paths remain in such path or paths at the ends of the trough so that they are less likely or unlikely to leave the path or paths and to escape into the surrounding atmosphere.

The novel features which are considered as characteristic of the invention are set forth in particular in the appended claims. The improved vibratory conveyor itself, however, both as to its construction and the mode of operating the same, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
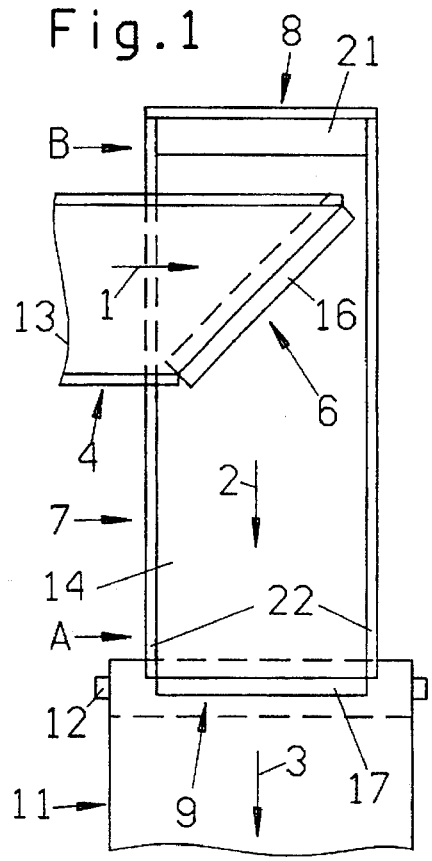
FIG. 1 is a schematic plan view of a vibratory conveyor which embodies one form of the invention and employs a first trough and a second trough serving to receive particles of bulk material from the first trough and to deliver the particles to a belt conveyor.
Figure 3:
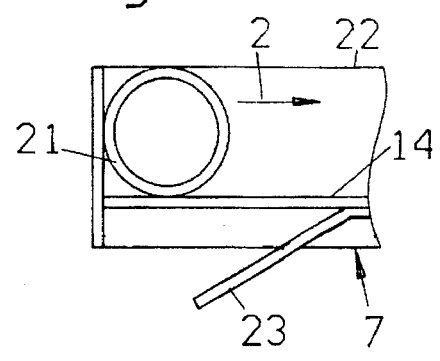
FIG. 3 is another fragmentary side elevational view of the second trough substantially as seen in the direction of arrow B in FIG. 1.
Figure 2:
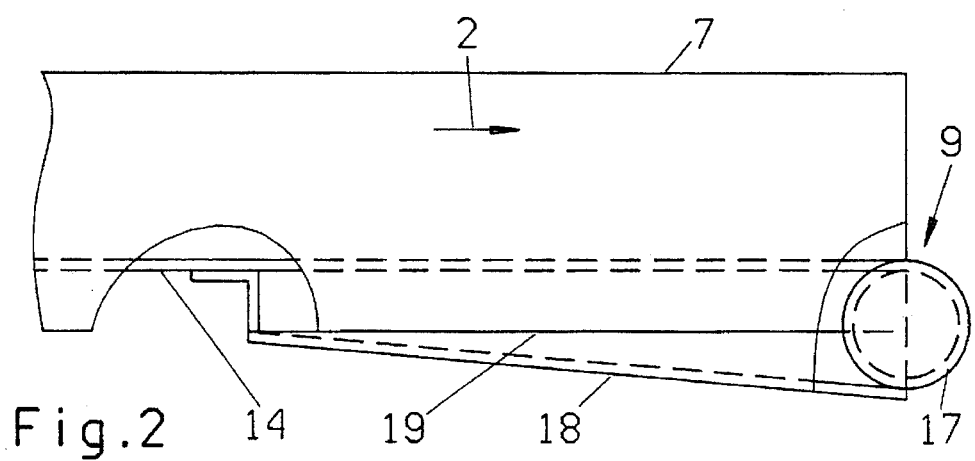
FIG. 2 is an enlarged fragmentary side elevational view of the second trough substantially as seen in the direction of arrow A in FIG. 1.

Referring first to FIGS. 1 to 3, there is shown a vibratory conveyor including a first trough 4 and a second trough 7 at a level below the trough 4. The trough 4 serves to deliver a stream or flow of particles of comminuted tobacco leaf laminae (with or without fragments of tobacco ribs) in the direction of arrow 1, and the trough 7 serves to thereupon advance the same stream or flow of particles in the direction indicated by arrow 2, namely at least substantially at right angles to he direction of arrow 1. The trough 7 delivers successive increments of the stream or flow onto the upper reach of an endless belt conveyor 11 which advances the particles in the direction of the arrow 3. The conveyor 11 is driven (either continuously or intermittently) by a prime mover (such as an electric motor, not shown) by way of a system of pulleys or sheaves (one shown at 12).

FIG. 1 merely shows the second or downstream end portion 6 of the trough 4; such end portion serves to discharge successive increments of the stream or flow of particles onto the upper side of a bottom wall 14 forming part of the trough 7. The bottom wall 13 of the trough 4 serves to advance the stream or flow from he first or upstram end portion (not shown) of the upper trough. The portion 6 makes with the direction of arrow 1 an oblique angle of approximately 45°; the first end portion of the trough 4 and the direction indicated by the arrow 1 can make an angle of approximately 90°, and the bottom wall 13 can receive particles from a suitable source, e.g., in a production line for the making of plain or filter cigarettes.

The boundaries of the end portions 8, 9 of the trough 7 extend at least subsantially at right angles to the direction which is indicated by the arrow 2, and at least one of these boundaries has a aerodynamically rounded profile. The rounded profile of the portion 9 is shown at 17 and the rounded profile of the portion 8 is shown at 21. The end portion 6 of the trough 4 is also provided with an aerodynamically rounded profile, as at 16.

As can be seen in FIG. 2, the portion 9 of the trough 7 includes a tube which extends transversely of (at right angles to) the direction which is indicated by the arrow 2 and defines the aerodynamically rounded profile 17. The apex of such profile is flush with the adjacent downstream end of the upper side of the bottom wall 14 forming part of the trough 7. The profile 21 at the upstream end of the bottom wall 14 is defined by a second tubular body which constitutes a rear wall of the trough 7 and is carried by the adjacent end portion of the wall 14. The axis of the second tubular body is parallel to that of the tubular body defining the boundary 17, The bottom wall 14 of the trough 7 is located at a level above a second bottom wall 18 (see FIG. 2) which is spaced apart from the wall 14, which also extends in the direction of arrow 2, and which slopes relative to the wall 14 in a direction from the front end portion 9 toward the rear end portion 8. In other words, the upper side of the front end of the second bottom wall 18 is located at a first distance from the portion 9, and the upper side of the rear end of the second bottom wall 18 is located at a lesser second distance from the portion 8. The second bottom wall 18 is flanked by two skirts 19 which are disposed in two parallel vertical or nearly vertical planes and are affixed to the bottom wall 18 and/or to the bottom wall 14.

The bottom walls 13, 14, 18 and/or the skirts 19 (and/or the other constituents of the trough 4 and/or 7) can be made of sheet metal or another suitable sheet or panel material.

FIGS. 1 and 3 further show parallel or substantially parallel sidewalls 22 which flank the bottom wall 14 and the tubular bodies at the end portions 8, 9 and cooperate with the bottom wall 14 to define an elongated channel for the advancement of particles of bulk material from the profile 16 of the end portion 6 of the upper trough 4 toward and beyond the profile 17 at the end portion 9 of the trough 7.

FIG. 3 shows a carrier 23 for attachment of one or more leaf springs forming part of the means for vibrating, agitating and/or otherwise reciprocating the trough 7 in a sense to ensure that the particles descending from the portion 6 of the upper trough 4 onto the bottom wall 14 of the trough 7 are caused to advance in the direction of the arrow 2, namely toward and beyond the portion 9 and onto the upper reach of the belt conveyor 11. The means for agitating the trough 7 can include a rotary prime mover (such as an electric motor) which drives an eccentric which, in turn, transmits motion to the trough 7 by way of the aforementioned leaf spring(s).

An important advantage of the vibratory conveyor embodying one or more troughs of the type shown in FIGS. 1 to 3 is that minute fragments of (tobacco and/or other) dust which are being entrained by the stream or flow of normally larger) particles of bulk material do not become segregated from the bulk material. This holds true for the advancement of particles of bulk material from the particle receiving portion toward the particle discharging portion of the trough as well as for advancement of particles beyond the particle discharging portion (such as 6 or 9) of the vibrating trough.

Though the provision of the aerodynamically profiled boundary 21 at the end portion 8 of the trough 7 is not critical, such boundary is desirable and advantageous on the ground that the trough 7 can be utilized for the transport of particles of bulk material from the portion 8 toward the portion 9 or in the opposite direction. In many instances, it suffices to provide an aerodynamically rounded profile at the particle discharging portion of the trough 4, 7 and/or a similar trough.

The establishment of a smooth transition from the upper side of the bottom wall 13 into the convex external surface of the tubular body at the end portion 6 of the trough 4 and/or from the upper side of the bottom wall 14 into the convex external surface of the tubular body at the end portion 9 of the trough 7 reduces the likelihood of repeated interruptions of the current or currents of air which are generated as a result of vibration of the bottom walls 13, 14 when the conveyor of FIGS. 1 to 3 is in use. Such absence of repeated interruptions is believed to be the reason that the improved vibratory conveyor is capable of retaining the entrained dust and/or other minute impurities in the path for the particles of bulk material so that the impurities cannot penetrate into the surrounding atmosphere and thus cannot affect the quality of air in the plant in which the conveyor is being put to use.

The rounded profile at the end portion 6 of the trough 4 and/or at the end portion 9 of the trough 7 need not necessarily form part of an ideal cylindrical surface; it suffices to select the profile in such a way that it enables the current(s) of air flowing along the upper side of the bottom wall 13 or 14 to follow the curvature of the profile at the respective portion 6 or 9 and to thus reduce or counteract the tendency of lightweight solid impurities to penetrate into the surrounding atmosphere, i.e., to leave the stream or flow of particles of bulk material. This is in contrast to the operation of conventional vibratory conveyors wherein the discharge ends of the troughs establish pronounced transitions (e.g., at 90-degree angles) between the upper sides of the bottom walls of the troughs and the surfaces at the discharge ends of the troughs; such design of the troughs enables the current(s) of air to advance beyond the discharge end in line with the direction of flow along the upper side of the bottom wall and to thus entrain lightweight solid impurities from successive increments of the descending stream or flow of particulate bulk material.

The purpose of the second or lower bottom wall 18 is to cooperate with the bottom wall 14 in order to establish circumstances which are not conducive to the development of air currents because such air currents, too, would be likely to establish circumstances for the entrainment or expulsion of minute solid impurities (such as tobacco dust) from the stream or flow of particulate bulk material at the discharge end(s) of the trough(s).

The purpose of the skirts 19 is to reduce the likelihood of accumulation of particles of bulk material in the space between the bottom walls 14 and 18.

The distance between the front end portions of the bottom walls 14, 18 can match (but can also be more or less than) the diameter of the tubular body of the portion 9 of the trough 7.

The provision of the tubular body 21 at the rear end portion 8 of the trough exhibits several advantages. First of all, such tubular body constitutes a simple rear wall for the channel which is defined by the bottom wall 14 and by the sidewalls 22 for the advancement of a flow of particulate bulk material from the end portion 6 of the trough 4 toward and beyond the end portion 9 of the trough 7. Secondly, it has been found that the tubular body 21 at the end portion 8 of the trough 7 reduces the likelihood of the development of air currents in the channel between the bottom wall 14 and the sidewalls 22 when the trough 7 is in actual use. A horizontal mass of air in the channel reacts against the tubular body 21 at the end portion 8 during each of a succession of high-frequency forward strokes of the trough 7. This reduces the likelihood of entrainment or expulsion of minute solid impurities from the channel of the trough 7 when the vibratory conveyor embodying such trough is in actual use.

The improved vibratory conveyor also exerts a beneficial influence upon the flow or stream of particulate bulk material along the prescribed path as indicated by the arrows 1, 2 and 3. Thus, by ensuring more satisfactory guidance and confinement of solid impurities in the path for the flow of particles of bulk material, the conveyor also ensures much more reliable retention of such particles in their prescribed path or paths than in conventional vibratory conveyors. This is due to the aforediscussed configuration of the path(s) for the flow or flows of particulate bulk material in the region of the particle discharging portion of each trough, as well as to accurate and predictable regulation (reduction) of the speed of the flow or flows of particles of bulk material at the discharge end of each trough. It has been found that the aforementioned advantages can be achieved even if the bulk material consists of or contains particles having a high specific flow resistance.

Figure 4:
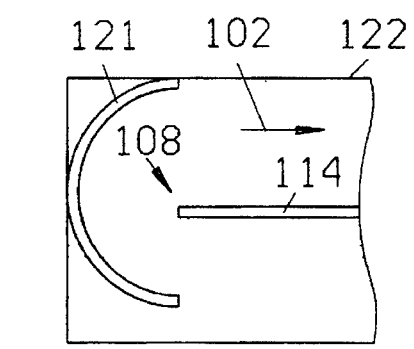
FIG. 4 is a fragmentary side elevational view of a trough forming part of a second vibratory conveyor.

FIG. 4 shows a trough 107 forming part of a modified vibratory conveyor. The trailing portion 108 of this trough includes a substantially semicylindrical member 121 having a concave side confronting the front end portion (not shown) of the trough and extending transversely of the direction (arrow 102) of advancement of particulate bulk material (and solid impurities, if any) in the channel between the bottom wall 114 and the sidewalls 122, Approximately one-half of the member 121 is disposed at a level above and the other half of this member is disposed at a level below the plane of the bottom wall 114.

The concave internal surface of the member 121 is accessible from the rear end of and is spaced apart from the bottom wall 114 so that any moisture which becomes separated from the bulk material on the bottom wall 114 can flow rearwardly toward and is deflected by the concave side of the member 121 when the trough 107 is being vibrated and/or otherwise agitated by a motor by way of an eccentric and one or more leaf springs and/or in any other suitable way.

Particles of tobacco often gather relatively high percentages of moisture when they are subjected to a conditioning treatment involving the application of heat and/or water and/or other liquid(s). The surplus of such moisture can be segregated from conditioned tobacco particles while the particles advance with and relative to the upper side of the bottom wall 114. Forward and rearward vibratory movements of the bottom wall 114 in actual use of the trough 107 initiate recurrent forward movements of particles of bulk material so that such material cannot pile up at a level below the discharge end of the preceding trough (such as the trough 4 of FIG. 1) or another device which supplies particles of bulk material onto the bottom wall 114. The thus intermittently advanced particles of bulk material advance the minute solid fragments of dust or other impurities which are intermixed with bulk material. Any surplus of moisture can flow rearwardly and beyond the bottom wall 114 (and against the concave side of the member 121) during alternate strokes of the trough 107. The flow of moisture along the upper side of and rearwardly beyond the bottom wall 114 encounters little resistance so that such moisture can be readily segregated from particulate bulk material.

Without further analysis, the foregoing will so fully reveal the gist of the present inventions that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A vibratory conveyor for the transport of particles of bulk material in a predetermined direction, comprising a trough having a vibratory first bottom wall; a particle receiving first portion and a particle discharging second portion spaced apart from said first portion in said direction, said first bottom wall extending in said direction between said first and second portions, each of said first and second portions having a boundary extending transversely of said direction and at least one of said boundaries having an aerodynamically rounded profile, said profile being defined by an external surface of a member carried by and vibrating with said first bottom wall and forming part of one of said first and second portions; a vibratory second bottom wall spaced apart from and disposed beneath and inclined relative to said first bottom wall in said direction from one of said first and second portions toward the other of said first and second portions; and skirts flanking said second bottom wall.

2. The conveyor of claim 1, wherein the bulk material contains dust and particles of tobacco.

3. The conveyor of claim 1, wherein said member is of an at least partially tubular member.

4. The conveyor of claim 1, wherein at least one of said boundaries is at least substantially normal to said direction.

5. The conveyor of claim 1, wherein at least one of said boundaries makes an oblique angle with said direction.

6. A vibratory conveyor for the transport of particles of bulk material in a predetermined direction, comprising a trough having a vibratory bottom wall, a particle receiving first portion and a particle discharging second portion spaced apart from said first portion in said direction, said bottom wall extending in said direction from said first portion toward said second portion and said first portion including a tubular rear wall carried by said bottom wall, each of said first and second portions having a boundary extending transversely of said direction and at least one of said boundaries having an aerodynamically rounded profile, said profile being defined by an external surface of a member carried by and vibrating with said bottom wall and forming part of one of said first and second portions.

7. A vibratory conveyor for the transport of particles of bulk material in a predetermined direction, comprising a trough having a vibratory bottom wall, a particle receiving first portion and a particle discharging second portion spaced apart from said first portion in said direction, said bottom wall extending in said direction from said first portion toward said second portion, said first portion including a partly tubular member extending transversely of said direction and having a concave side confronting said second portion, each of said first and second portions having a boundary extending transversely of said direction and at least one of said boundaries having an aerodynamically rounded profile, said profile being defined by an external surface of a member carried by and vibrating with said bottom wall and forming part of one of said first and second portions.

8. A vibratory conveyor for the transport of particles of bulk material in a predetermined direction, comprising a first trough having a vibratory bottom wall, a particle receiving first portion and a particle discharging second portion spaced apart from said first portion in said direction, each of said first and second portions having a boundary extending transversely of said direction and at least one of said boundaries having an aerodynamically rounded profile, said profile being defined by an external surface of a member carried by and vibrating with said bottom wall and forming part of one of said first and second portions, said bottom wall being elongated and extending from said first portion toward said second portion; and a second trough disposed at a level above said first trough and having a particle receiving first portion and a particle discharging second portion at least partially overlying said bottom wall, at least said second portion of said second trough having a boundary with an aerodynamically rounded profile.

9. The conveyor of claim 8, wherein said second trough further comprises an elongated second bottom wall extending from the respective first portion toward the respective second portion and substantially at right angles to said direction.

10. The conveyor of claim 9, wherein said boundary of the second portion of said second trough makes with said direction an oblique angle.

* * * * *